US011860645B1

(12) United States Patent
Graham et al.

(10) Patent No.: US 11,860,645 B1
(45) Date of Patent: *Jan. 2, 2024

(54) UNMANNED VEHICLE SECURITY GUARD

(71) Applicant: UIPCO, LLC, San Antonio, TX (US)

(72) Inventors: Richard Daniel Graham, Plano, TX (US); Kade Scott, Dallas, TX (US); Matthew Flachsbart, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,366

(22) Filed: Jun. 13, 2022

Related U.S. Application Data

(63) Continuation of application No. 16/676,875, filed on Nov. 7, 2019, now Pat. No. 11,392,145, which is a continuation of application No. 15/596,898, filed on May 16, 2017, now Pat. No. 10,474,168.

(60) Provisional application No. 62/337,071, filed on May 16, 2016.

(51) Int. Cl.
| *G05D 1/12* | (2006.01) |
| *B64D 47/08* | (2006.01) |
| *G05D 1/00* | (2006.01) |
| *B64C 39/02* | (2023.01) |
| *B64D 5/00* | (2006.01) |
| *B64U 101/00* | (2023.01) |

(52) U.S. Cl.
CPC ............ *G05D 1/12* (2013.01); *B64C 39/024* (2013.01); *B64D 5/00* (2013.01); *B64D 47/08* (2013.01); *G05D 1/0027* (2013.01); *B64U 2101/00* (2023.01)

(58) Field of Classification Search
CPC ...... G05D 1/12; G05D 1/0027; B64C 39/024; B64D 5/00; B64D 47/08; B64U 2101/00
See application file for complete search history.

(56) References Cited

U.S. PATENT DOCUMENTS

| 7,797,174 B2 | 9/2010 | Samuels |
| 7,885,832 B2 | 2/2011 | Collins et al. |
| 8,447,672 B2 | 5/2013 | DeLoach |
| 9,754,325 B1* | 9/2017 | Konrardy ............... G08G 1/005 |
| 10,166,994 B1* | 1/2019 | Fields .................... B60K 35/00 |
| 10,474,168 B1* | 11/2019 | Graham ................... B64D 5/00 |
| 11,392,145 B1* | 7/2022 | Graham ................... G05D 1/12 |

(Continued)

FOREIGN PATENT DOCUMENTS

CN        112446793 A        3/2021

OTHER PUBLICATIONS

Blockchains, smart contracts, and the death of specific performance Hinkes, Andrew. Inside Counsel. Breaking News; New York (Jul. 29, 2014). (Year: 2014).

(Continued)

*Primary Examiner* — Gertrude Arthur Jeanglaude
(74) *Attorney, Agent, or Firm* — BakerHostetler

(57) ABSTRACT

Unmanned vehicles can be terrestrial, aerial, nautical, or multi-mode. Unmanned vehicles may be used to survey a property in response to or in anticipation of a threat. For example, an unmanned vehicle may analyze information about the property and based on the information deter theft of items on the property.

20 Claims, 4 Drawing Sheets

(56) References Cited

U.S. PATENT DOCUMENTS

| | | |
|---|---|---|
| 2005/0006206 A1 | 1/2005 | Balk et al. |
| 2007/0094053 A1 | 4/2007 | Samuels |
| 2007/0168268 A1 | 7/2007 | Lange et al. |
| 2007/0214072 A1 | 9/2007 | Stone |
| 2008/0082370 A1 | 4/2008 | Collins et al. |
| 2009/0106054 A1 | 4/2009 | Sarel |
| 2015/0154710 A1 | 6/2015 | Samuels et al. |
| 2016/0078551 A1 | 3/2016 | Samuels |
| 2016/0091894 A1 | 3/2016 | Zhang et al. |
| 2017/0177006 A1 | 6/2017 | Fisher et al. |

OTHER PUBLICATIONS

Hidden Flipside; Bitcoin's future The Economist 410.8878: 71 (US). Economist Intelligence Unit NA Incorporated. (Mar. 15, 2014) (Year: 2014).

Riders, exchanges driving popularity of life policies By Katie Kuehner-Hebert. BenefitsPro Sep. 2, 2014: NA. (Year: 2014).

\* cited by examiner

UNMANNED VEHICLE SECURITY GUARD

CROSS-REFERENCE TO RELATED APPLICATION

The present application claims priority to and is a continuation of U.S. patent application Ser. No. 16/676,875, filed Nov. 7, 2019, which is a continuation of U.S. patent application Ser. No. 15/596,898, filed May 16, 2017, now U.S. Pat. No. 10,474,168, which issued on Nov. 12, 2019, which claims priority to, and the benefit of Provisional Patent Application No. 62/337,071 filed May 16, 2016, which is incorporated herein by reference in its entirety.

BACKGROUND OF THE INVENTION

Unmanned vehicles (e.g., unmanned aerial vehicles) are known for their use in combat zones. In combat zones, they are often used to surveille an area, damage a structures, or lethally wound a potential enemy combatant. The use of unmanned vehicles can go far beyond the aforementioned examples, especially outside of a combat zone and in a commercial setting. Businesses of all sorts are now developing innovative ways to use unmanned vehicles to benefit their business.

SUMMARY

Unmanned vehicles can be terrestrial, aerial, nautical, or multi-mode. Unmanned vehicles may be used to surveille a property in response to or in anticipation of a threat. For example, an unmanned vehicle may analyze information about the property and based on the information deter theft of items on the property.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Unmanned vehicles may be used to proactively or reactively secure one or more properties. For example, an unmanned vehicle may surveille a property in response to or in anticipation of a threat. For example, an unmanned vehicle may analyze information about the property and based on the information deter theft of items on the property.

Figure 1:
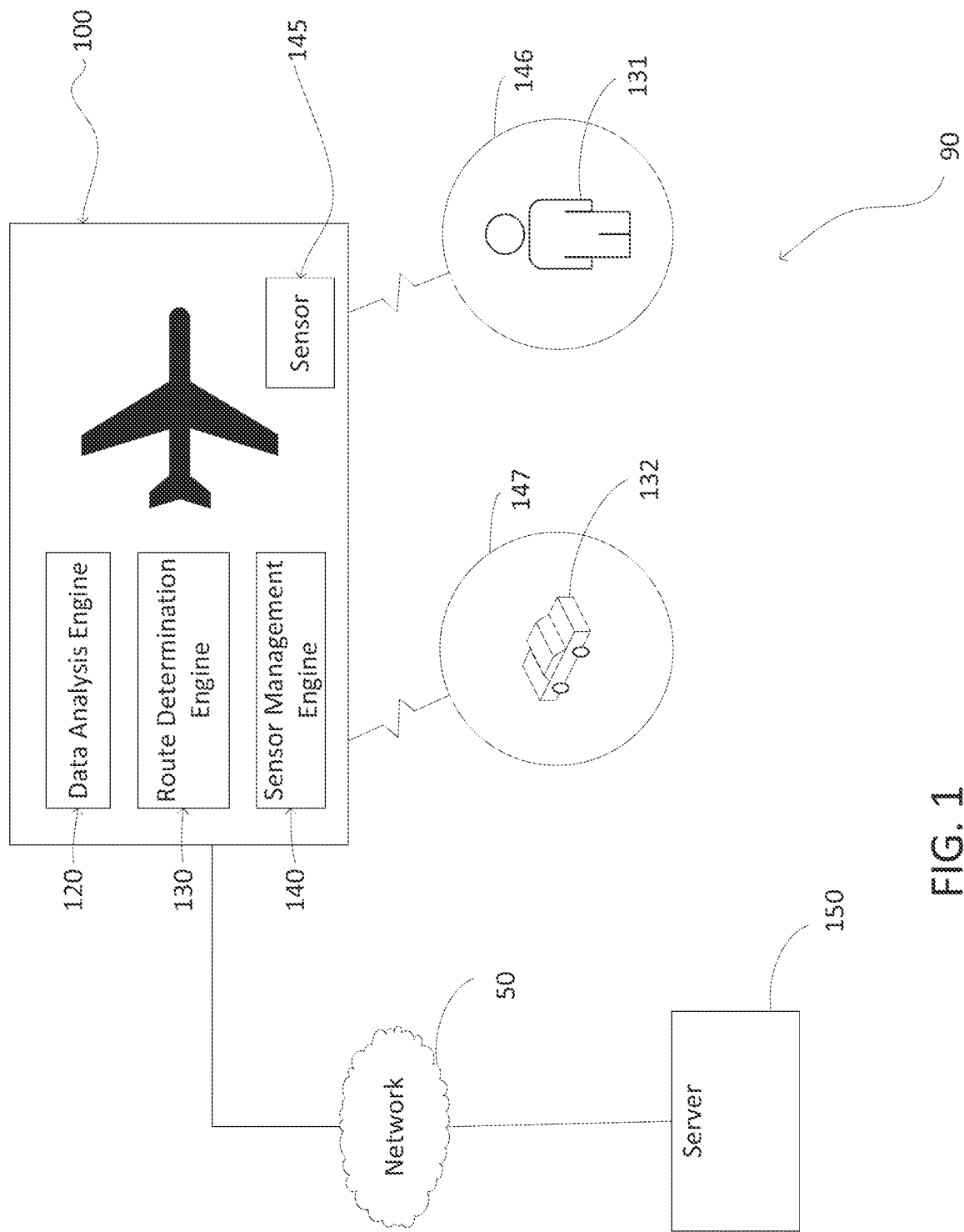
FIG. 1 illustrates an exemplary system associated with a unmanned vehicle security guard.

FIG. 1 illustrates an exemplary system 90 associated with an unmanned vehicle security guard. Unmanned vehicle 100 includes sensor 145, data analysis engine 120, route determination engine 130, and sensor management engine 140. Unmanned vehicle 100 may be communicatively connected with network 50 and server 150. A business (e.g., an insurance provider or law enforcement agency) may own or have control of unmanned vehicle 100, network 50, or server 150. Person 131 (e.g., a homeowner or intruder) may be located in area 146 and vehicle 132 (e.g., an automobile, motorcycle, or boat—possibly unmanned) may be located in area 147, as shown.

Figure 4:
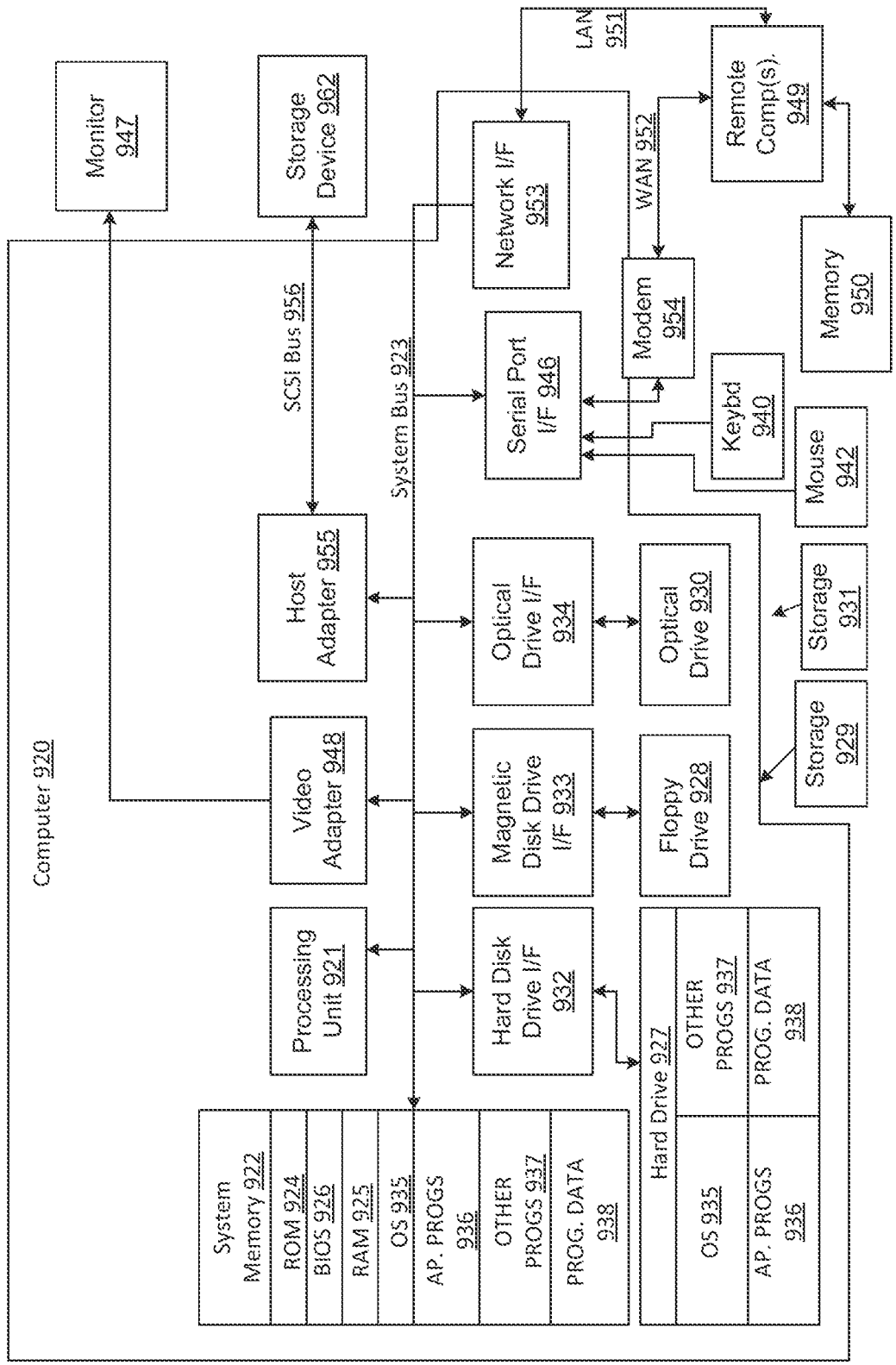
FIG. 4 is an exemplary block diagram representing a computer system in which aspects of the methods and systems disclosed herein or portions thereof may be incorporated.

With continued reference to FIG. 1, data analysis engine 120, route determination engine 130, and sensor management engine 140 are logical entities that may be implemented in the form of software (e.g., computer-executable instructions) stored in a memory of, and executing on a processor of unmanned vehicle 100, server 150, or another computer system such as illustrated in FIG. 4. Data analysis engine 120 may analyze data retrieved by sensor 145. Analysis by data analysis engine 120 may include comparing image data of person 131 or vehicle 132 to other information (e.g., information on server 150) to identify vehicle 132 or person 131. Route determination engine 130 may be utilized to manage unmanned vehicle 100, which may include confirming that unmanned vehicle 100 remains on a planned path based on a particular mission. Route determination engine 130 may also determine modifications to a route of unmanned vehicle 100 based on gathered information. For example, if additional images (e.g., picture or video) are needed of an alleged intruder (e.g., a certain location, which may include a different perspective or angle) route determination engine 130 may request unmanned vehicle 100 to vary the planned path accordingly, which may change the parameters of the mission. Another example may be for unmanned vehicle 100 to pursue person 131 (e.g., an alleged intruder) in order to identify the position of person 131 until law enforcement arrives.

Sensor management engine 140 controls sensor 145. This control may include directing which sensor of a plurality of sensors gathers information, directing the operating characteristics of said information gathering (e.g., the level of zoom of a visible light camera), directing where sensor 145 is aimed, or any other sensor performance control variables. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, a gas sensor, or a navigation sensor, among other things.

Figure 2:
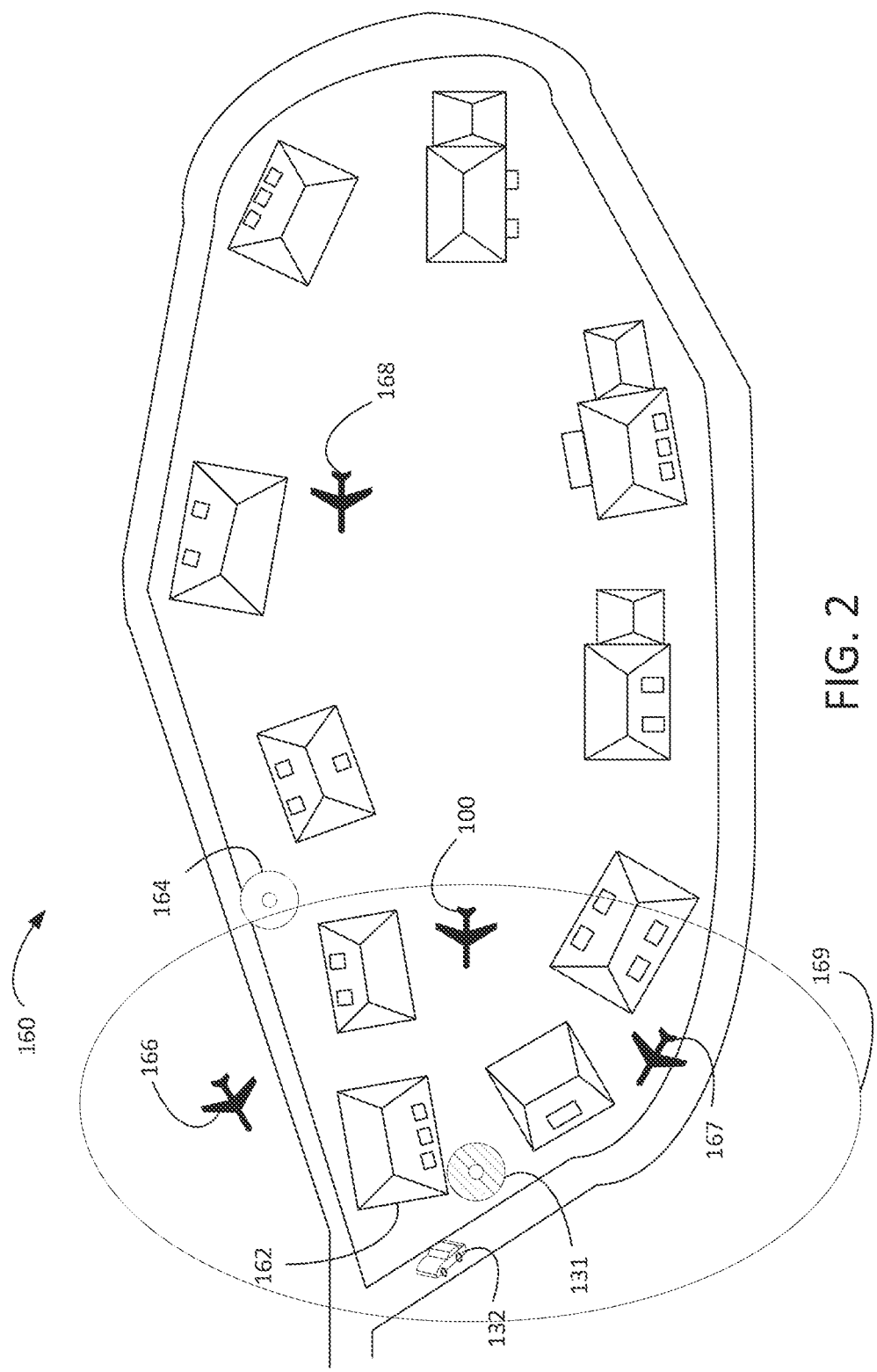
FIG. 2 illustrates an overhead view of an exemplary neighborhood that may be surveilled by an unmanned vehicle.

FIG. 2 illustrates an overhead view of a neighborhood 160 that one or more unmanned vehicles may patrol. As shown, there may be a plurality of houses, such as house 162, in neighborhood 160. House 162 may have one or more sensors attached to it or the surrounding land within the property line associated with house 162. Neighborhood 160 may have a plurality of unmanned vehicles, such as unmanned vehicle 100, unmanned vehicle 166, unmanned vehicle 167, or unmanned vehicle 168. There may be a vehicle 132 in neighborhood 160 and persons, such as person 131 or person 164. Vehicle 132 may include sensors and may be a smart car that may have automated features with regard to self-driving or remote turn on/off. The houses, cars, and unmanned vehicles in neighborhood 160 may be communicatively connected with each other and share information captured by their respective sensors, indications of a threat level, or other information.

Figure 3:
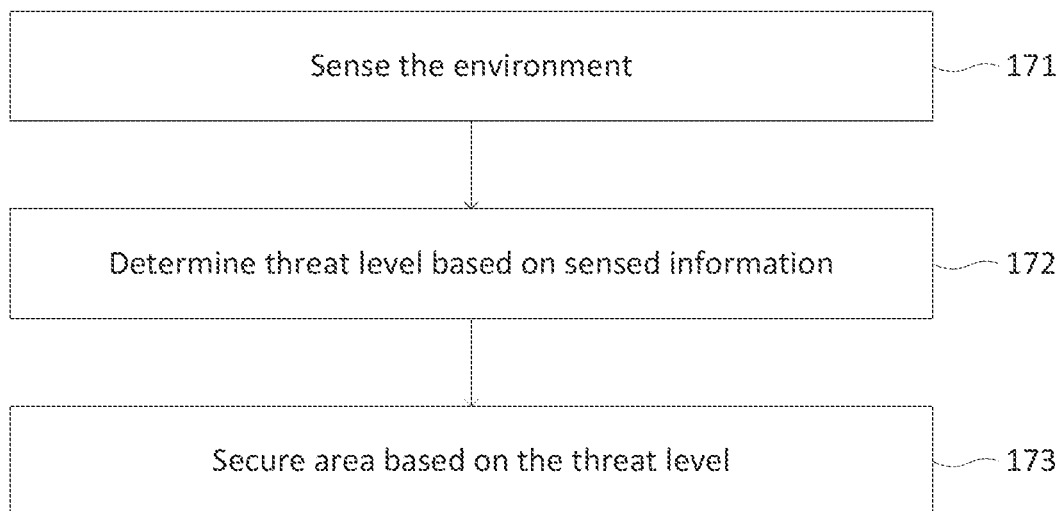
FIG. 3 illustrates an exemplary method for providing security using an unmanned vehicle.

FIG. 3 illustrates an exemplary method to secure one or more properties with use of an unmanned vehicle. At step 171, the environment (here neighborhood 160) is sensed by one more sensors. The sensed information may be from sensor 145 of unmanned vehicle 100 or other sensors or devices of house 162, vehicle 132, person 164, person 131, or sensors of unmanned vehicles 166, 167, and 168. In an example, house 162, vehicle 162, or unmanned vehicle 166 may have sensors that include a camera or motion detector, among other things. Person 164 or person 131 may have location sensors, cameras, wearable activity sensors, or manual indicators (e.g., alert button or text message), among other things. Activity sensors (also known as activity trackers) are wireless-enabled wearable devices that measure data such as the number of steps walked, heart rate, quality of sleep, steps climbed, and other personal metrics. Heart rate and other information from the activity sensor may be used to determine threat level. For example, higher the heart rate, then may be the more likely a threat. The heart rate may be compared to a baseline of that person. The heart rate may be indication that someone else proximate to the sensed person is a threat.

At step 172, a threat level may be determined based on at least the sensed information of step 171. The sensed information of step 171 may be combined in a variety ways with other information to determine the threat level of a general environment (e.g., neighborhood 160 overall), person (e.g., person 131), or thing (e.g., vehicle 132—car bomb). The determination and display of the threat level may occur in real-time. The threat level may be constantly updated. In an example, house 162 and vehicle 132 may sense movement, which may trigger unmanned vehicle 100 to investigate an area proximate to house 162 and vehicle 132. When unmanned vehicle 100 arrives proximate to house 162, it may sense (e.g., via a camera) the activity or identity of a person, animal, or thing. In this example, the threat level may be determined by analyzing a combination of information including sensed movement from house 162 and vehicle 132 (e.g., movement or speed of movement), sensed identity (e.g., facial recognition) and activity patterns (e.g., sidewalk or bushes) of a person by unmanned vehicle 100, heart rate of person 131 by activity sensor, time of day, or history of negative activity (e.g., break-ins) proximate to house 162, among other things.

As discussed herein, identity may be sensed in different ways. For example, person 131 may have a mobile device or activity sensor that wirelessly transmits identity of person 131 when unmanned vehicle 100 is within a particularly close distance (e.g., 10 feet) of person 131. In another example, person 131 may have an ID that may communicate via RFID or a driver's license type ID with a barcode that may be scanned by sensor 145 of unmanned vehicle 100. In another example, an authorized person (e.g., a homeowner—person 164) of the security system of neighborhood 160 may program a temporary (e.g., 2 hours or a day) authorization code for person 131, just in case person 131 is observed in neighborhood 160 by unmanned vehicle 100. The authorization code may be associated with an RFID, driver's license, mobile phone, or activity tracker. In addition, the authorization code may be associated with a hand gesture, spoken code, texted code, or facial recognition, among other things. Threat level considerations that may tie into identity may include how many times and what issues occurred when person 131, animal (e.g., wolf), or thing (e.g., car) entered into neighborhood 160 during a previous period, if at all.

With continued reference to FIG. 3, at step 173, the area (e.g., neighborhood 160, area 147, area 146, or area 169) may be secured based on the determined threat level. Securing an area may include sending alerts, triggering sirens, turning off devices in an area, or other actions which deter or neutralize a threat. In an example, the threat level of step 172 may be formerly classified based on the threat level reaching a certain threshold. For instance, the classification system may include four threshold levels which may be classified as low, elevated, high, or severe. The classifications may be displayed on a digitally displayed neighborhood map (e.g., a real-time updated heat map of threat levels of areas around houses in neighborhood 160) or sent to a subscriber mobile device via text message, among other things. The classifications may also provide for mandatory actions by unmanned vehicle 100 or other devices in neighborhood 160. For example, at a classified high threat level, there may be mandatory video recording of all devices in neighborhood 160 or mandatory enablement of location services for all wireless devices in neighborhood 160.

As discussed herein, when the threat level reaches a threshold level (e.g., high threat level or 90 rating), unmanned vehicle 100 may take certain actions to secure neighborhood 160. In an example, when unmanned vehicle 100 determines a high threat level based on sensed information from sensor 145, the entire neighborhood 160 may be lit or regions of neighborhood 160 may be lit based on lights being proximate (e.g., area 169) to the security threat, which may be person 131. An example action by unmanned vehicle 100 may be to tag person 131 with an electronic beacon, with fluorescent paint, or the like. Based on the tag areas may be lit up, as well as alerts sent to different devices (e.g., mobile device). Fluorescent paint may be discovered or tracked by a camera, while an electronic beacon may send out wireless signals. Another example action may be for unmanned vehicle 100 to follow and video record person 100. The video recording may be live streamed to televisions or mobile devices in neighborhood 160. Another example action may be for unmanned vehicle 100 to split into multiple drones and follow person 131 and person 164.

With continued reference to step 173 of FIG. 3, in a first example scenario, person 131 may have a high threat level. Cameras throughout neighborhood 160 may be directed to turn to the location of unmanned vehicle 100 or the location of person 131 based on other sensed information from unmanned vehicle 100. Unmanned vehicle 100 may be used as beacon for other security related systems in neighborhood 160 to focus on or be directed by. In a second example scenario, unmanned vehicle 100 may indicate it is low on battery life. Because the integration of the security systems throughout neighborhood 160, unmanned vehicle 168 may automatically communicate that it will take the place of unmanned vehicle 100. In a third example scenario, person 131 may have a high threat level. A plurality of unmanned vehicles, such as unmanned vehicle 100, unmanned vehicle 166, and unmanned vehicle 167 may converge on area 169. Unmanned vehicle 100, unmanned vehicle 166, and unmanned vehicle 167 may be strategically placed in locations around person 131 (e.g., a perimeter) based on the geography of neighborhood 160 (e.g., cliffs, dead-end roads, walls, etc. . . . ). The geography of neighborhood 160 may be used to determine not only location, but the number of unmanned vehicles used to surveille person 131. Unmanned vehicle 100 may shutdown self-driving/automated vehicles (e.g., vehicle 132) in area 169, lock down houses (e.g., doors and windows of house 162), send alerts via social media, alert law enforcement, or alert insurance service providers for a possible claim, among other things. The unmanned vehicles of neighborhood 160 may be positioned based on crime statistics (e.g., break-ins), which may or may not be based on threat level.

Unmanned vehicle 100 may be attached to house 162 and deployed periodically to proactively surveille house 162 or other property in neighborhood 160. Deployment of unmanned vehicle 100 may be responsive to sensed information (e.g., motion) or historical information (crime statistics of neighborhood 160 or comparable neighborhoods). Unmanned vehicle 100 may be a shared resource for service providers (e.g., insurance providers). House 162 may be a smart home or the like. Generally, a smart home may be considered a home equipped with lighting, heating, and other electronic devices that may be controlled remotely by phone or computer and may be programmed to be automated. Multiple unmanned vehicles may be deployed based on the reason of deployment, specifications of an unmanned vehicle (e.g., range of unmanned vehicle), or consideration of information gathered after deployment. Unmanned vehicle 100 may release another unmanned vehicle (not shown) that may be smaller and be able go into restricted areas (e.g., inside a home). Unmanned vehicle 100 may have multiple sensors.

Sensed information may be encrypted, stored, or shared according to various criteria. In a fourth example scenario, unmanned vehicle 100 may indicate that it desires the identity of person 131. As discussed herein, person 131 may have an RFID, driver's license, or mobile device that is able to provide the identity of person 131. In an example, the mobile device may not send the identification to unmanned vehicle 100 directly, but may determine the most secure link (e.g., WiFi of house 162) to securely connect with server 150. Server 150 may send only an indication of authorization (no identity information) to unmanned vehicle 100.

The present disclosure is directed to an unmanned vehicle security guard. It is to be understood that any terms, phrases, structural and functional details, disclosed herein are merely examples for teaching various ways to employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents.

Although at least one series of steps are presented as an exemplary method of practicing one or more examples described herein, it is contemplated that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links formed between data interfaces. Communication links may comprise either wired or wireless links. It is to be appreciated that the illustrated network connections in the figures (e.g., FIG. 1 or FIG. 4) are exemplary and other ways of establishing a communications link between multiple devices may be used.

FIG. 4 and the following discussion are intended to provide a brief general description of a suitable computing environment in which the methods and systems disclosed herein or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 4 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 4. The logical connections depicted in FIG. 4 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed is:

1. An unmanned vehicle comprising:
   a processor; and
   a memory coupled with the processor, the memory having stored thereon executable instructions that when executed by the processor cause the processor to effectuate operations comprising:
   receiving data collected by an activity sensor, wherein the data is associated with a person within a surveilled environment;
   analyzing the data collected by the activity sensor;
   determining, based on the analyzed data, a threat level associated with the person; and
   securing, based on the determined threat level, the surveilled environment.

2. The unmanned vehicle of claim 1, wherein the operations further comprise:
   receiving external data from a device external to the unmanned vehicle;

analyzing the external data; and determining, based on the analyzed external data, the threat level.

3. The unmanned vehicle of claim 1, wherein the operations further comprise patrolling an area of the surveilled environment.

4. The unmanned vehicle of claim 1, wherein the activity sensor comprises a camera; and wherein the operations further comprise controlling a zoom level and a direction of aim of the camera.

5. The unmanned vehicle of claim 1, wherein the activity sensor comprises a device worn by the person and the data comprises at least one of steps walked, heart rate, quality of sleep, and steps climbed.

6. The unmanned vehicle of claim 1, wherein the securing the surveilled environment comprises transmitting an alert indicative of the threat level to one or more devices external to the unmanned vehicle.

7. A system comprising:

an activity sensor; and an unmanned vehicle in communication with the activity sensor, wherein the unmanned vehicle is configured to:

receive data from the activity sensor, wherein the data is associated with a person within a surveilled environment, analyze the data received from the activity sensor, determine, based on the analyzed data, a threat level associated with the person, and secure, based on the determined threat level, the surveilled environment.

8. The system of claim 7, wherein the unmanned vehicle comprises an unmanned aerial vehicle.

9. The system of claim 7, wherein the unmanned vehicle comprises:

a first unmanned vehicle; and a second unmanned vehicle configured to:

house the first unmanned vehicle;

deploy the first unmanned vehicle; and guide the first unmanned vehicle.

10. The system of claim 7, wherein unmanned vehicle is configured to secure the surveilled environment by:

tagging, with paint or an electronic beacon, the person or an object in the surveilled environment; and transmitting a notification indicative of the tagging to one or more devices associated with the surveilled environment.

11. The system of claim 7, wherein the activity sensor is configured to scan an identification barcode and identify the person based on the scanning the identification barcode.

12. A method comprising:

receiving, by an unmanned vehicle and from an activity sensor, data associated with a person within a surveilled environment;

analyzing, by the unmanned vehicle, the data received from the activity sensor;

determining, by the unmanned vehicle and based on the analyzed data, a threat level associated with the person; and securing, by the unmanned vehicle and based on the determined threat level, the surveilled environment.

13. The method of claim 12, wherein the activity data received from the sensor comprises a heart rate of the person; and wherein the analyzing the data comprises comparing the heart rate of the person to a baseline heart rate of the person.

14. The method of claim 12, wherein the data from the sensor comprises an image of the person and wherein the analyzing the data comprises comparing, by the unmanned vehicle, the image to stored information, and identifying, by the unmanned vehicle and based on the comparing the image to the stored information, the person.

15. The method of claim 12, further comprising:

navigating, by the unmanned vehicle, a planned path; and modifying, by the unmanned vehicle and based on the data from the activity sensor, the planned path.

16. The method of claim 15, wherein the modifying the planned path is based on a travel path of the person.

17. The method of claim 12, wherein the securing the surveilled environment comprises causing, by the unmanned vehicle, at least one device associated with the surveilled environment to turn on or to turn off.

18. The method of claim 12, wherein the securing the surveilled environment comprises causing, by the unmanned vehicle, one or more structures in the surveilled environment to lock.

19. The method of claim 12, further comprising accessing, by the unmanned vehicle and based on the data received from the activity sensor, stored information associated with the surveilled environment; and wherein the determining the threat level is further based on the accessed information.

20. The method of claim 12, wherein the security the surveilled environment comprises transmitting, by the unmanned vehicle and to another unmanned vehicle, a request for the another unmanned vehicle to travel to a position at the surveilled environment.

* * * * *